US008788433B2

(12) United States Patent
Shiraiwa et al.

(10) Patent No.: US 8,788,433 B2
(45) Date of Patent: Jul. 22, 2014

(54) INVOICE AMOUNT CALCULATION METHOD, INVOICE AMOUNT CALCULATION DEVICE, AND PRINTER INVOICING SYSTEM

(75) Inventors: Motofumi Shiraiwa, Nagano-ken (JP); Fumihiko Yanagisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 13/531,852

(22) Filed: Jun. 25, 2012

(65) Prior Publication Data

US 2013/0002752 A1 Jan. 3, 2013

(30) Foreign Application Priority Data

Jun. 30, 2011 (JP) ................................ 2011-145135
Jun. 30, 2011 (JP) ................................ 2011-145136

(51) Int. Cl.
*G06F 17/00* (2006.01)

(52) U.S. Cl.
USPC .......................................... 705/400; 347/19

(58) Field of Classification Search
USPC .............. 347/19; 705/400, 402, 404; 702/55; 358/1.14, 1.15
See application file for complete search history.

(56) References Cited

U.S. PATENT DOCUMENTS

| | | | | |
|---|---|---|---|---|
| 6,360,174 | B1 | 3/2002 | Shoki | |
| 7,001,006 | B2 * | 2/2006 | Kanamaru | 347/7 |
| 7,216,111 | B2 | 5/2007 | Horii et al. | |
| 7,280,928 | B2 * | 10/2007 | Nishihara | 702/55 |
| 7,373,305 | B2 | 5/2008 | Horii et al. | |
| 8,489,521 | B2 * | 7/2013 | Shiraiwa et al. | 705/400 |
| 8,553,243 | B2 * | 10/2013 | Murahashi et al. | 358/1.14 |
| 2002/0135624 | A1 | 9/2002 | Naka et al. | |
| 2003/0020951 | A1 | 1/2003 | Minowa et al. | |
| 2007/0103716 | A1 | 5/2007 | Shiraiwa et al. | |

FOREIGN PATENT DOCUMENTS

| | | | |
|---|---|---|---|
| CN | 1405704 | | 3/2003 |
| EP | 1541365 | A1 | 6/2005 |
| EP | 1780024 | A2 | 5/2007 |
| JP | 2002-036582 | | 2/2002 |

* cited by examiner

*Primary Examiner* — Lamson Nguyen

(57) ABSTRACT

A manufacturer server 110 that calculates an invoice amount for an inkjet printer has a billing status acquisition unit 342 that acquires billing status information including actual print volume PV, which is the amount of ink used for actual printing not including maintenance during a specific period L1; an actual print volume calculation unit 343 that determines if actual print volume PV is less than or equal to a specific volume V1; and an invoice amount calculation unit 344 that calculates an invoice amount. When actual print volume PV is less than or equal to the specific volume V1, a first invoice amount, which is a fixed amount, is calculated as the invoice amount, and when actual print volume PV exceeds the specific volume V1, a second invoice amount is calculated based on the actual print volume PV as the invoice amount.

14 Claims, 14 Drawing Sheets

(a) MAINTENANCE VOLUME MV PER MONTH (ESTIMATED) : 5 cc (b) TOTAL INK USAGE PER MONTH : 20 cc

[RATIO OF MAINTENANCE VOLUME MV TO TOTAL INK USAGE : 25%
TOTAL INK USAGE PER MONTH : 5 cc / 25% = 20 cc]

(c) SPECIFIC VOLUME V1 (ACTUAL PRINT VOLUME PER MONTH) : 15 cc
SPECIFIC VOLUME V1: 20 cc - 5 cc = 15 cc (d) FIRST INVOICE AMOUNT (FIXED AMOUNT) : 2000 yen

[STANDARD PRICE OF 1 cc INK : 100 yen
FIRST INVOICE AMOUNT : 20 cc x 100 yen = 2000 yen]

(e) SECOND INVOICE AMOUNT Y $$Y = C1 \times ( V2 - V1 ) + B$$

[COEFFICIENT C1 : DISCOUNT PRICE OF 1 cc INK : 60 yen
B : FIRST INVOICE AMOUNT]

EX : INVOICE AMOUNT FOR ACTUAL PRINT VOLUME V2 (30 cc)

Y = 60 yen x (30 cc - 15 cc) + 2000 = 2900 yen

FIG. 13

FIG. 14A

| | ACTUAL PRINT VOLUME PREVIOUS MONTH | ADJUSTMENT AMOUNT | FIRST INVOICE AMOUNT |
|---|---|---|---|
| PRINTER 001 | 40cc | -200 yen | 1800 yen |
| PRINTER 002 | 20cc | -200 yen | 1800 yen |
| PRINTER 003 | 10cc | 0 yen | 2000 yen |

(THRESHOLD : 20 cc)

FIG. 14B

| | ACTUAL PRINT VOLUME PREVIOUS MONTH | COEFFICIENT C1 |
|---|---|---|
| PRINTER 001 | 80cc | 50yen |
| PRINTER 002 | 40cc | 50yen |
| PRINTER 003 | 20cc | 60yen |

(THRESHOLD : 40 cc)

INVOICE AMOUNT CALCULATION METHOD, INVOICE AMOUNT CALCULATION DEVICE, AND PRINTER INVOICING SYSTEM

RELATED APPLICATION(S)

This application claims priority under 35 U.S.C. §119 on Japanese applications 2011-145135 and 2011-145136, both filed on Jun. 30, 2011. The content of each such Japanese application is incorporated by reference herein.

BACKGROUND

1. Technical Field

The present invention relates to a method of calculating an invoice amount for inkjet printer use, a device that calculates the invoice amount, and a printer invoicing system.

2. Related Art

Billing methods that issue invoices according to the amount of ink used by an inkjet printer are known from the literature. See, for example, Japanese Unexamined Patent Appl. Pub. JP-A-2002-36582. Some inkjet printers use an optical sensor to measure the amount of ink remaining in the ink tank, and calculate how much ink was used (ink consumption) based on the remaining amount of ink. A host computer connected to the inkjet printer gets the ink consumption information from the inkjet printer, and sends data related to ink consumption over a network to a service center server. The service center server refers to an ink volume price table, calculates the invoice amount based on actual ink consumption, and generates a bill that is sent to the user.

Inkjet printers commonly perform maintenance operations such as head cleaning and flushing (waste ejection) in order to prevent ink coagulation and to expel bubbles from the printhead or ink path. As a result, when calculating ink consumption based on the amount of ink remaining in the ink tank as described in JP-A-2002-36582, the calculated invoice amount includes not only the amount of ink used for printing ("actual print volume" below), but also the amount of ink used for printhead maintenance ("maintenance volume" below). This means that the billed customer must also pay for ink that is used for operations other than actual printing, leading to customer dissatisfaction.

Methods of calculating the invoice amount based only on the actual print volume are also conceivable. This involves some method of measuring the actual print volume and then calculating the invoice amount based on the product of the actual print volume and the ink price. For the customer, this eliminates the sense of being disadvantaged by paying for ink used for maintenance and provides the added merit of enabling easier budgeting because the amount invoiced for actual printing is clear. However, because inkjet printers require maintenance as described above, ink is also consumed when not printing. The amount of ink used for maintenance therefore increases relative to the actual print volume in the case of customers with low volume printing needs, reducing the amount invoiced relative to total ink consumption and making this business model not viable for the ink supplier that issues the invoices. As a result, a business model that calculates the invoice amount based only on the actual print volume is only applicable to large customers with high print volumes, and applying this business model to customers with low print volumes is not practical at present.

SUMMARY

A method of calculating an invoice amount for inkjet printer use, a device for calculating the invoice amount, and a printer invoicing system according to the invention enable achieving a business model that is not disadvantageous for either the side that issues the invoice or the side that is invoiced.

One aspect of the invention is embodied in an invoice amount calculation method for an inkjet printer that performs maintenance accompanied by ink consumption. The includes acquiring an actual print volume PV, which is the amount of ink used for actual printing not including maintenance during a specific period L1; determining if the actual print volume PV is less than or equal to a specific volume V1; calculating an invoice amount by calculating (i) a first invoice amount, which is a fixed amount, as the invoice amount when the actual print volume PV is less than or equal to the specific volume V1, and (ii) a second invoice amount based on the actual print volume PV as the invoice amount when the actual print volume PV exceeds the specific volume V1.

This aspect of the invention can eliminate the disadvantage for the customer when the customer's print volume is low, because, when the actual print volume PV is at or below a specific volume, the invoice amount is a fixed amount. That is, the problem of the business model not being viable when the invoice amount is low relative to total ink consumption can be resolved.

On the other hand, when the actual print volume PV exceeds the specific volume V1, that is, when the volume printed by the customer is high, the customer pays an invoice amount based on the PV and is thus not disadvantaged, the invoice amount increasing with increasing PV. Thus, the customer has the benefit of being able to budget more easily because the customer pays an amount based only on the amount of ink used for actual printing.

Accordingly, a business model that is not disadvantageous for either side (customer or ink supplier) regardless of the amount of printing can therefore be achieved, the number of potential customers can be increased, and the business model can be further developed.

Note that a "fixed amount" means an amount that does not change according to the actual print volume PV in the specific period L1.

The "second invoice amount" can be calculated based on an algorithm that uses the actual print volume PV as a parameter, and the algorithm can be a linear function, quadratic function, or other type of function.

"Maintenance accompanied by ink consumption" means operations such as flushing (waste ejection) and ink suction operations during cleaning processes. The amount of ink used to initially charge the printhead with ink is also preferably not included in the actual print volume.

In another aspect, when the actual print volume PV is less than or equal to the specific volume V1, the first invoice amount is calculated based on the total of the specific volume V1 and a maintenance volume MV, which is the amount of ink used for maintenance in the specific period L1.

This aspect of the invention can eliminate the disadvantage for the billing side when the actual print volume PV is less than or equal to the specific volume V1, that is, when the customer's print volume is low, because the invoice amount is a first invoice amount that considers the maintenance volume MV. More specifically, the problem of the business model not being viable when the invoice amount is low relative to total ink consumption can be resolved.

In an invoice amount calculation method according to another aspect of the invention, the first invoice amount is calculated based a past actual print volume PV.

By thus changing the first invoice amount according a past actual print volume PV, customer benefits can be improved such as by providing customers with high volume printing needs a discount.

Note that when the specific period is one month, for example, a past actual print volume PV means the actual print volume during a previous time period, e.g., the previous month or set number of months, the past year, or the average actual print volume from the first billing month to the previous month.

Further alternatively, a configuration that acquires the maintenance volume, which is the amount of ink used for maintenance, and varies the first invoice amount according to the past maintenance volume, or according to the past total ink usage (actual print volume+maintenance volume), is also conceivable. Further alternatively, the first invoice amount could be changed according to the ratio between the actual print volume and the maintenance volume during the same past period of time. Further alternatively, the first invoice amount could be varied according to the actual print volume, the maintenance volume, the total ink usage, and the ratio between the actual print volume and maintenance volume MV during that month (the specific period for which the invoice amount is calculated).

In an invoice amount calculation method according to another aspect of the invention, the maintenance volume MV is a fixed value, and the first invoice amount is a fixed amount that does not vary according to the actual print volume PV in the specific period L1.

By using a fixed amount as the first invoice amount, this aspect of the invention makes the billing system easy to understand.

In another aspect of the invention, the first invoice amount is also calculated according to an adjustment amount that is added to or subtracted from a base fixed amount according to a past actual print volume PV, where the base fixed amount is the product of an ink price and the total of the specific volume V1 and the maintenance volume MV.

By using the product of an ink price and the total of the specific volume V1 and the maintenance volume MV as a base fixed amount, a minimum amount that is not disadvantageous for the side billing for the invoice amount can be assured. In addition, when the past actual print volume PV is high, the feeling of being at a disadvantage can be reduced for customers with great seasonal variation in the actual print volume PV by, for example, reducing the fixed amount.

In another aspect of the invention, the second invoice amount is calculated based on the product of the actual print volume PV and a coefficient C1 (where C1>0) that varies according to a past actual print volume PV.

By varying the coefficient C1 according the past actual print volume PV, customer benefits can be improved by, for example, providing a discount for customers with a high print volume (by reducing the value of coefficient C1).

Further alternatively, a configuration that acquires the maintenance volume, which is the amount of ink used for maintenance, and varies the coefficient C1 according to the past maintenance volume, or according to the past total ink usage (actual print volume+maintenance volume), is also conceivable. Further alternatively, the coefficient C1 could be changed according to the ratio between the actual print volume and the maintenance volume during the same past period of time. Further alternatively, the coefficient C1 could be varied according to the actual print volume, the maintenance volume, the total ink usage, and the ratio between the actual print volume and maintenance volume MV during that month (the specific period for which the invoice amount is calculated).

In another aspect of the invention, the past actual print volume PV is the actual print volume in a period immediately prior to the specific period L1.

Preferably, the period immediately prior to the specific period L1 is the same length of time as L1, that is, one month when L1 is one month, one year when L1 is one year, etc.

An invoice amount calculation method according to another aspect of the invention preferably also includes monitoring the actual print volume PV at one or more specific times before the end of the specific period L1; and issuing a warning when the actual print volume PV is less than or equal to a specific volume V0 (where 0<V0<=V1).

By issuing a warning when the actual print volume PV is less than or equal to the specific volume V0 at a specific time before the end of the specific period L1, this aspect of the invention can inform the customer of the possibility of being billed for the first invoice amount. More specifically, because the second invoice amount is more beneficial for the customer than the first invoice amount, informing the customer that the actual print volume PV during the specific period L1 has not reached the specific volume V1 enables the customer to take steps to increase the actual print volume PV so that the second invoice amount applies.

Note that a warning can be issued in various ways, including sending a printer alarm command to the inkjet printer, or sending e-mail to the customer's e-mail address.

Another aspect of the invention is an invoice amount calculation device for an inkjet printer that performs maintenance accompanied by ink consumption. Such device includes an actual print volume acquisition unit that acquires an actual print volume PV, which is the amount of ink used for actual printing not including maintenance, during a specific period L1; an actual print volume evaluation unit that determines if the actual print volume PV is less than or equal to a specific volume V1; and an invoice amount calculation unit that calculates an invoice amount. The invoice calculation unit calculates a first invoice amount, which is a fixed amount, as invoice amount when the actual print PV is less than or equal to the specific volume V1, and calculates a second invoice amount based on the actual print volume PV as the invoice amount when the actual print volume PV exceeds the specific volume V1.

In an invoice amount calculation device according to another aspect of the invention, the invoice amount calculation unit calculates the first invoice amount based on the total of the specific volume V1 and a maintenance volume MV, which is the amount of ink used for maintenance in the specific period L1.

Another aspect of the invention is a printer invoicing system including the invoice amount calculation device described above in communication with a printing system including a printing unit that prints by ejecting ink. The printing unit includes an ejection detection unit that detects ink ejection by the print unit, a maintenance unit that performs the maintenance according to the detection result from the ejection detection unit, and an actual print volume measuring unit that measures the actual print volume PV used for printing by the print unit; wherein the actual print volume acquisition unit acquires the result of measurement by the actual print volume measuring unit.

This configuration enables applying the invention to a system configured with a printing system including an inkjet printer and the invoice amount calculation device in separate locations.

Note that in addition to maintenance accompanied by ink consumption such as flushing (waste ejection) and ink suction operations, the maintenance unit preferably also performs maintenance not accompanied by ink consumption, such as wiping (a process that wipes the printhead).

In a printer invoicing system according to another aspect of the invention, the ejection detection unit detects if ink was ejected each time a specific amount of printing is completed by the print unit; and the maintenance unit performs maintenance when the ejection detection unit detects that ink was not ejected.

This configuration can efficiently and reliably prevent poor ink ejection.

Note that instead of detecting ink ejection by all ink nozzles every time, the ejection detection unit could change the nozzles (nozzle line) that are inspected each time printing a specific amount is completed. Further preferably, maintenance is only applied to the nozzles that were inspected when nozzles that are not ejecting ink are detected. This configuration can reduce unnecessary ink consumption.

In the printer invoicing system described above the maintenance unit performs maintenance based on environmental conditions including at least one of temperature, barometric pressure, and humidity.

This configuration can apply maintenance appropriately according to such ambient conditions as the temperature, barometric pressure, and humidity. More specifically, unnecessary ink consumption can be reduced by performing the minimum maintenance required according to the temperature, barometric pressure, humidity, or other environmental conditions.

In a printer invoicing system according to another aspect of the invention, the printing system preferably further includes an actual print volume monitoring unit that checks the actual print volume PV at one or more specific times before the end of the specific period L1 based on the result of measurement by the actual print volume measuring unit; and a warning unit that issues a warning when the actual print volume PV is less than or equal to a specific volume V0 (where $0<V0<=V1$).

By warning when the actual print volume PV is the specific volume V0 or less at a specific time before the end of the specific period L1, this aspect of the invention can inform the customer of the possibility of being billed for the first invoice amount.

The method of warning may be visual using an LED or display screen, or audible by sounding an electronic buzzer, for example.

BRIEF DESCRIPTION OF THE DRAWINGS

FIGS. 13(*a*)-*e*) describe methods of calculating a first invoice amount and a second invoice amount.

FIGS. 14A and 14B shows variations of the invoice amount calculation methods.

DESCRIPTION OF EMBODIMENTS

A preferred embodiment of a method of calculating an invoice amount, a device for calculating an invoice amount, and a printer invoicing system according to the invention is described below with reference to the accompanying figures.

Summary of a Printer Invoicing System

Figure 1:
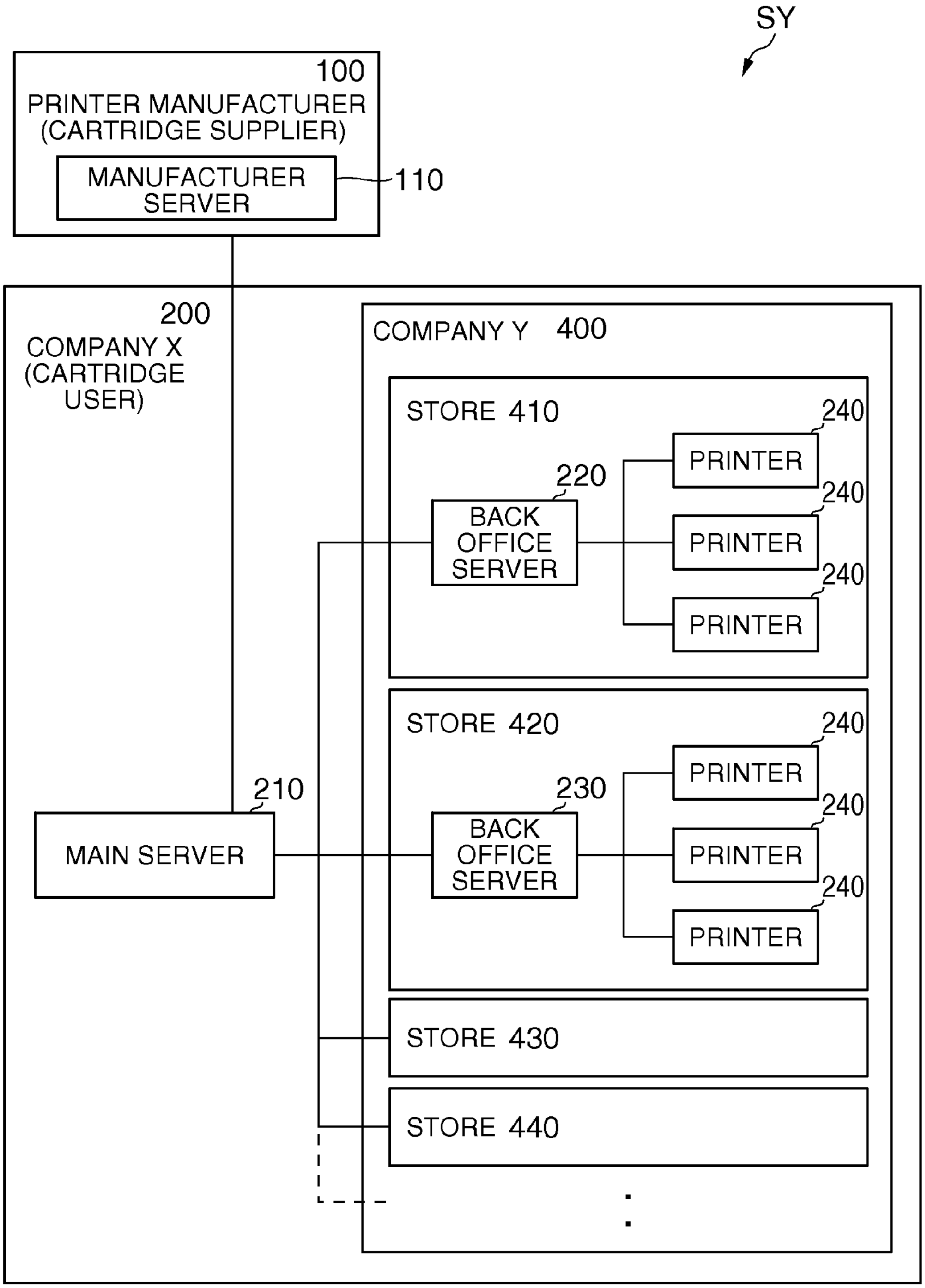
FIG. 1 is a block diagram showing the configuration of a printer invoicing system.

FIG. 1 is a block diagram of a printer invoicing system SY. The printer invoicing system SY according to this embodiment of the invention is based on a business model in which a printer manufacturer (ink cartridge supplier) 100 supplies ink cartridges to a company X 200 (ink cartridge user, customer) that purchased multiple color inkjet printers 240, and the company X 200 pays an invoice amount to the printer manufacturer 100 based on the amount of ink used for printing by each of the printers 240. The system includes the multiple printers 240 installed indifferent stores, back office servers 220, 230 connected to each of the printers 240 in the respective stores, a main server 210 connected to the back office server 220, 230 in each store, and a manufacturer server 110 connected to the main server 210. In this configuration the manufacturer server 110 functions as a invoice amount calculating device, and the main server 210, back office servers 220, 230, and printers 240 function as a printing system.

In this printer invoicing system SY, company X 200 is a company that issues coupons for particular products and earns advertising income based on the number of coupons issued. The company X 200 installs a back office server 220, 230 and a plurality of printers 240 purchased from the printer manufacturer 100 in plural stores 410 to 440 managed by another company Y 400. Note that for brevity only back office servers 220, 230 and printers 240 installed in stores 410 and 420 are shown in FIG. 1. Each printer 240 can communicate with the back office server 220, 230 over a LAN.

Company Y 400 is a supermarket or other retail store operator. The printer 240 is a coupon printer that is separate from the receipt printer, and a printer 240 is installed near each checkout counter in the stores 410 to 440. The printers 240 are configured to issue coupons related to product information input from the POS terminal according to commands from the back office server 220, 230 installed in the same store (back office server 220 used for example below), and the printed coupon is then handed to the customer by the POS terminal operator employed by company Y 400.

The main server 210 is operated by company X 200, and is communicatively connected with the back office server 220 in each of the stores 410 to 440 over the Internet, a phone line or other public telecommunication line, or a dedicated line. The main server 210 sends image data for the coupons to be printed by the printers 240 to the back off ice server 220 together with product information for the related products. The main server 210 also collects the type and number of coupons printed by the printers 240 from the back office server 220.

In this printer invoicing system SY the printer manufacturer 100 has previously supplied ink cartridges to company X. Company X 200 installs the ink cartridges in the printers 240 at the checkout counters of company Y 400. The POS terminal operator reads the barcodes including product codes from the products, and outputs the product information corresponding to the product codes to the back office server 220. The back office server 220 thus acquires the product information, and if there is coupon information for the received product information, sends image data for the corresponding coupon to the printer 240. The back office server 220 located in each store 410 to 440 regularly collects information related to the amount of ink used by each connected printer 240, and sends the information to the main server 210.

Company X 200 then sends information related to ink consumption by each printer 240 stored in the main server 210 over the Internet or other connection to the manufacturer server 110. The ink consumption information could obviously be stored on a CD (Compact Disc), DVD (Digital Versatile Disc), or other recording medium which is then mailed to the printer manufacturer 100. The manufacturer server 110 tabulates the ink consumption information supplied from the company X 200, calculates the invoice amount for the amount of ink used, and bills company X 200. In this printer invoicing system SY the printer manufacturer 100 also collects the empty ink cartridges 20 that are removed after the ink ends. The printer manufacturer 100 refills the recovered ink cartridges 20 with ink and supplies the refilled ink cartridges 20 to the company X 200.

This printer invoicing system SY is configured to bill only for the amount of ink that is used to print coupons, and does not bill the customer for ink that is used for maintenance operations or for the initial printhead charging operation (including suctioning ink for initial charging).

Maintenance operations include flushing the printhead 247, ink suction for cleaning the printhead, and cleaning operations used to remove ink clogs and restore the printhead. An advantage for company X 200 is therefore that the inkjet printers 240 can be used to print expressive, high quality coupons without being concerned about the cost of ink that is not directly used for printing coupons.

The invoice amount is determined according to the amount of ink used to print coupons during a specific period of time (such as one month). This is referred to as the "actual print volume PV" below. However, billing according to the actual print volume PV in this way is not a viable business model for the printer manufacturer 100 for printers 240 with a low print volume because the amount of ink used for maintenance may be greater than the amount of ink actually used for printing coupons. The business model is therefore made viable for the printer manufacturer 100 by billing a fixed amount for low volume printers 240 until ink consumption reaches a certain actual print volume PV. This is described in detail further below with reference to FIG. 12.

Printer Configuration

Figure 2:
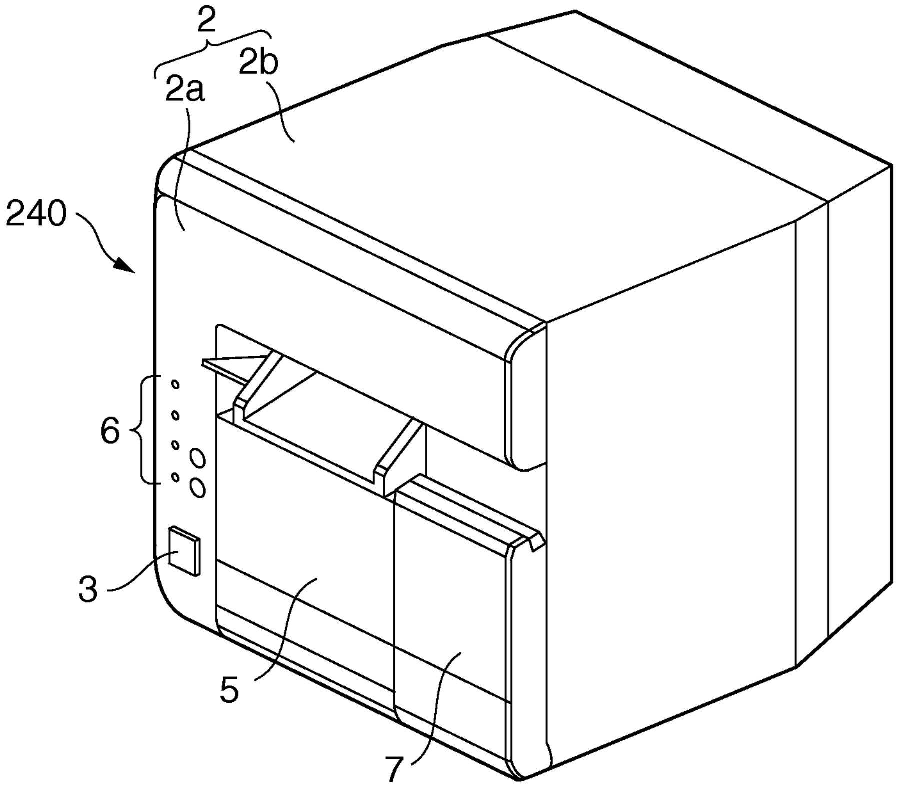
FIG. 2 is an oblique view of a printer with the two front covers closed.
Figure 3:
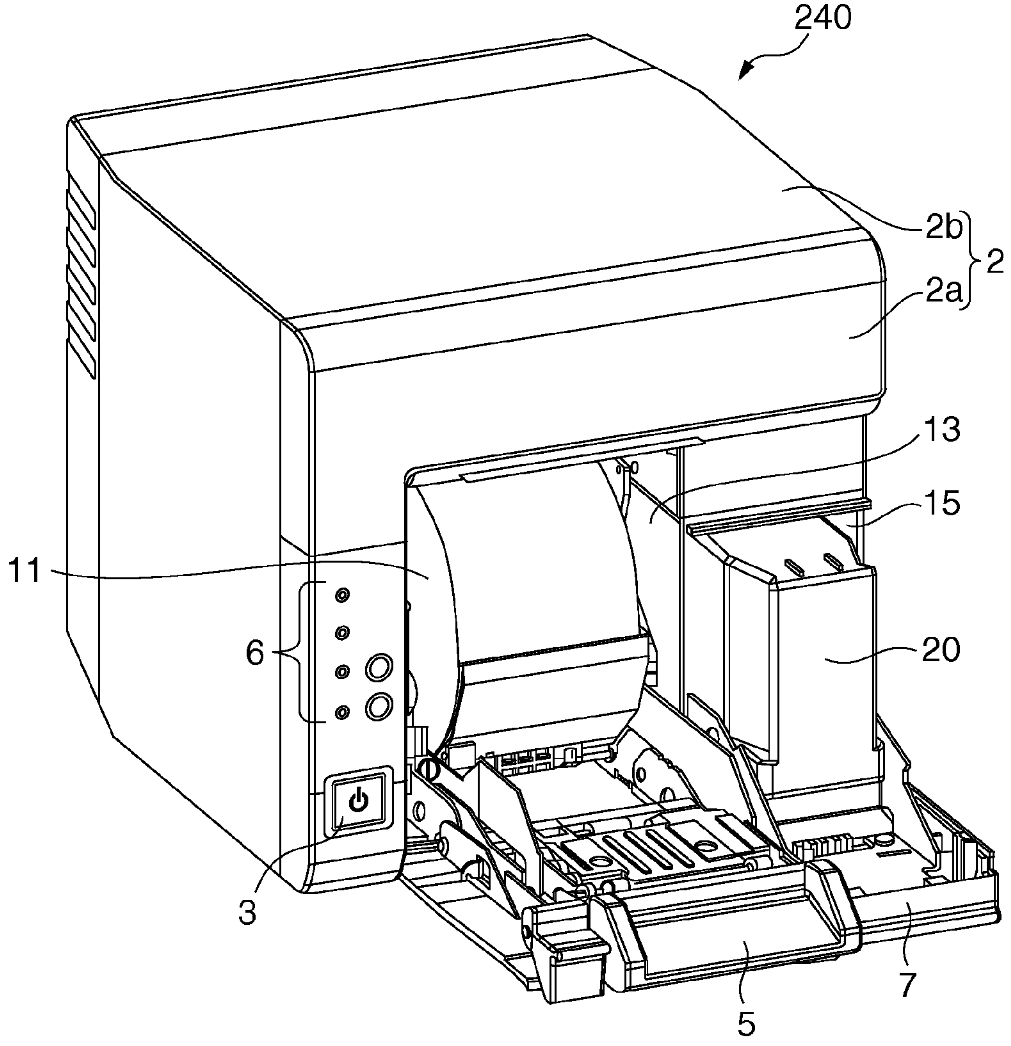
FIG. 3 is an oblique view of a printer with the two front covers open.

FIG. 2 is an oblique view showing a printer 240 with the two front covers closed, and FIG. 3 is an oblique view of the printer 240 with the two front covers open. As shown in the figures, the printer 240 according to this embodiment of the invention has a power switch 3, roll paper cover 5, and ink cartridge unit cover 7 disposed from left to right at the front of the printer case 2, which includes a front top panel 2*a* and a case cover 2*b*. Above the power switch 3 is are plural LEDs 6 used to display the status of the printer 240 for the user. The roll paper cover 5 and ink cartridge unit cover 7 can open and close to the front pivoting on hinges not shown disposed at the bottom.

When the roll paper cover 5 opens, the roll paper compartment 13 in which the roll paper 11 is stored opens, enabling the roll paper 11 to be replaced. When the ink cartridge unit cover 7 is opened, the cartridge holder 15 opens, enabling replacing the ink cartridge 20 in the cartridge holder 15.

The ink cartridge 20 has three color ink packs for yellow, cyan, and magenta packaged in a single cartridge case 41. In the printer 240 according to this embodiment of the invention, the ink cartridge 20 in the cartridge holder 15 slides between the cartridge replacement position described below and the cartridge use position in conjunction with the ink cartridge unit cover 7 opening and closing.

Figure 4:
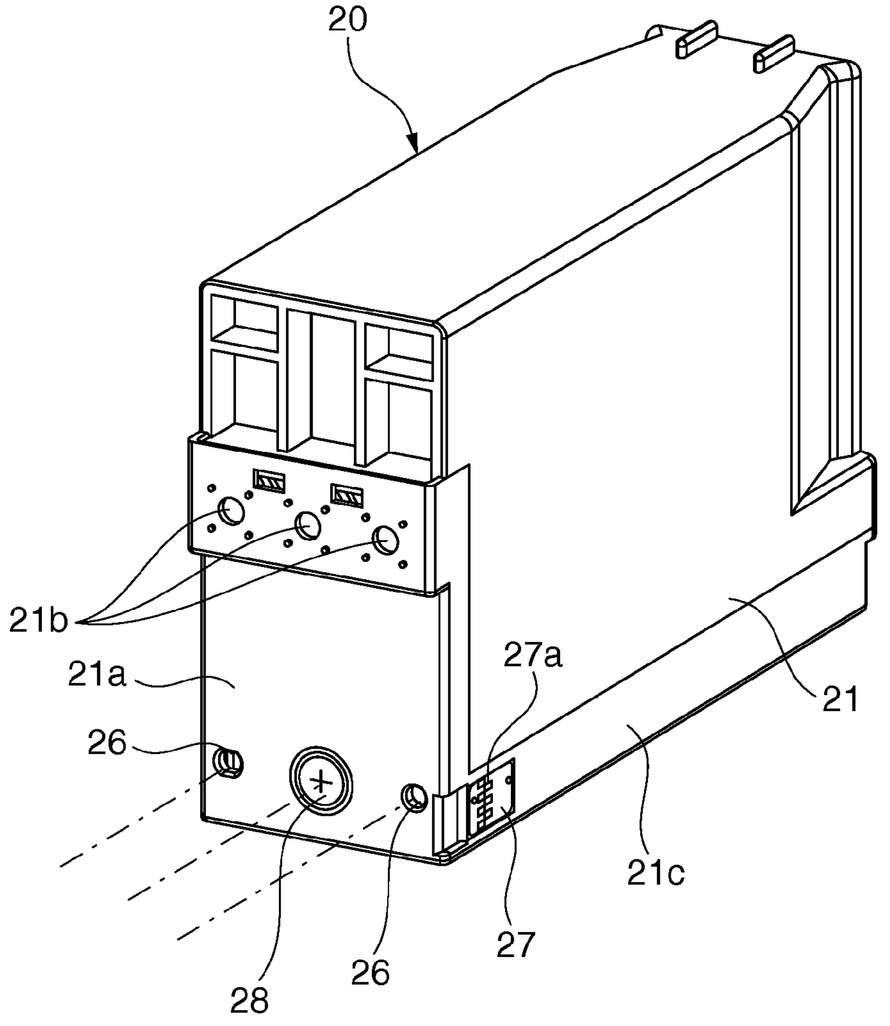
FIG. 4 is an external oblique view of an ink cartridge.

FIG. 4 is an external oblique view of the ink cartridge 20 installed in the printer 240. Two positioning holes 26 are formed in the bottom part of the back 21*a* of the ink cartridge 20. When installed in the cartridge holder 15 of the printer 240, the ink cartridge 20 slides while being guided by positioning pins not shown in the positioning holes 26, and the position of the ink cartridge 20 is thereby fixed. Three ink supply holes 21*b* are open in the middle of the back 21*a*, and the three colors of ink in the ink cartridge 20 are supplied through these ink supply holes 21*b* to the printer 240.

A waste ink recovery port 28 for collecting waste ink that is used for maintenance and is not used for printing by the printer 240 is also provided between the positioning holes 26. Waste ink is recovered through this waste ink recovery port 28 into the ink cartridge 20. In addition to functioning as an ink tank for supplying ink, the ink cartridge 20 in this embodiment of the invention thus also functions as a waste ink tank for storing waste ink.

A memory device 27 is embedded with the surface of the connection terminal 27*a* exposed in one side 21*c* of the ink cartridge 20. This memory device 27 is memory that internally stores an ink cartridge ID identifying the ink cartridge, and is rewritable nonvolatile memory for writing information such as the ink shot (ink ejection) count. The printer 240 writes data to the memory device 27 through an electrical connection between the connection terminal 27*a* formed in the exposed surface and a connection terminal not shown disposed in the cartridge holder 15 of the printer 240.

Relationship between the Back Office Server and Printer

Figure 5:
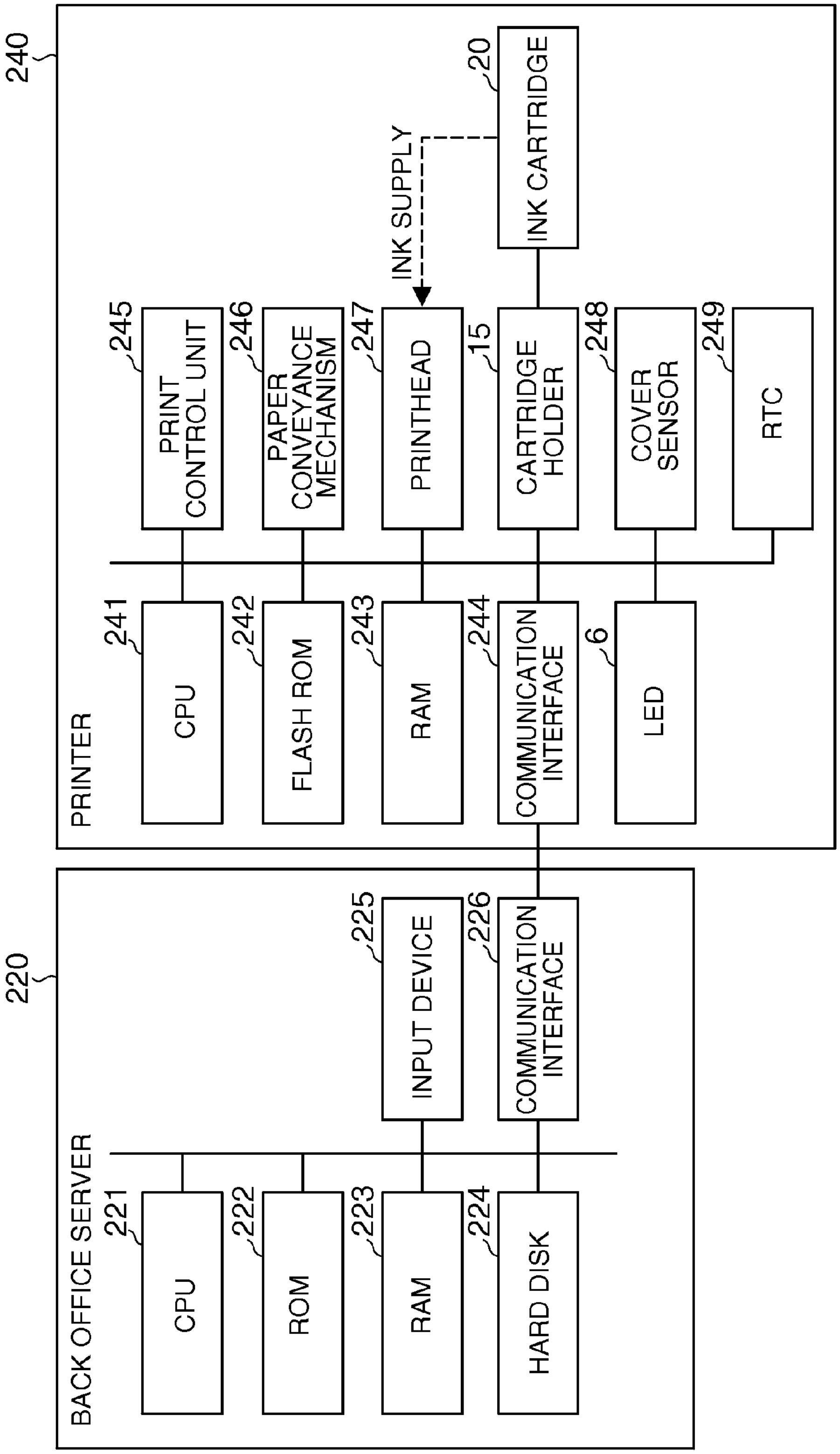
FIG. 5 is a control block diagram of a back office server and a printer.

FIG. 5 is a control block diagram of the back office server 220 and printer 240. As shown in the figure, the back office server 220 has a CPU 221, ROM 222, RAM 223, hard disk 224, input device 225, and communication interface 226. The back office server 220 controls the printer 240 by outputting commands and print data through the communication interface 226 to the printer 240 while the CPU 221 runs an operating system and application program stored on the hard disk 224.

The printer 240 has a CPU 241, flash ROM 242, RAM 243, communication interface 244, print control unit 245, paper conveyance mechanism 246, printhead 247, cover sensor 248, RTC (real-time clock) 249, and cartridge holder 15. The cover sensor 248 detects if the roll paper cover 5 and ink cartridge unit cover 7 are open or closed. The RTC 249 is used to track the actual print volume PV measurement period (one month in this embodiment of the invention). The ink cartridge 20 is installed in the cartridge holder 15. The printer 240 receives print data by the CPU 241 executing firmware stored in flash ROM 242 while communicating through the communication interface 244 with the back office server 220. Based on the received commands and print data, the print control unit 245 drives the printhead 247 to print on the roll paper 11 while conveying the roll paper 11 by means of the paper conveyance mechanism 246 to issue a coupon.

Printer Functions

Figure 6:
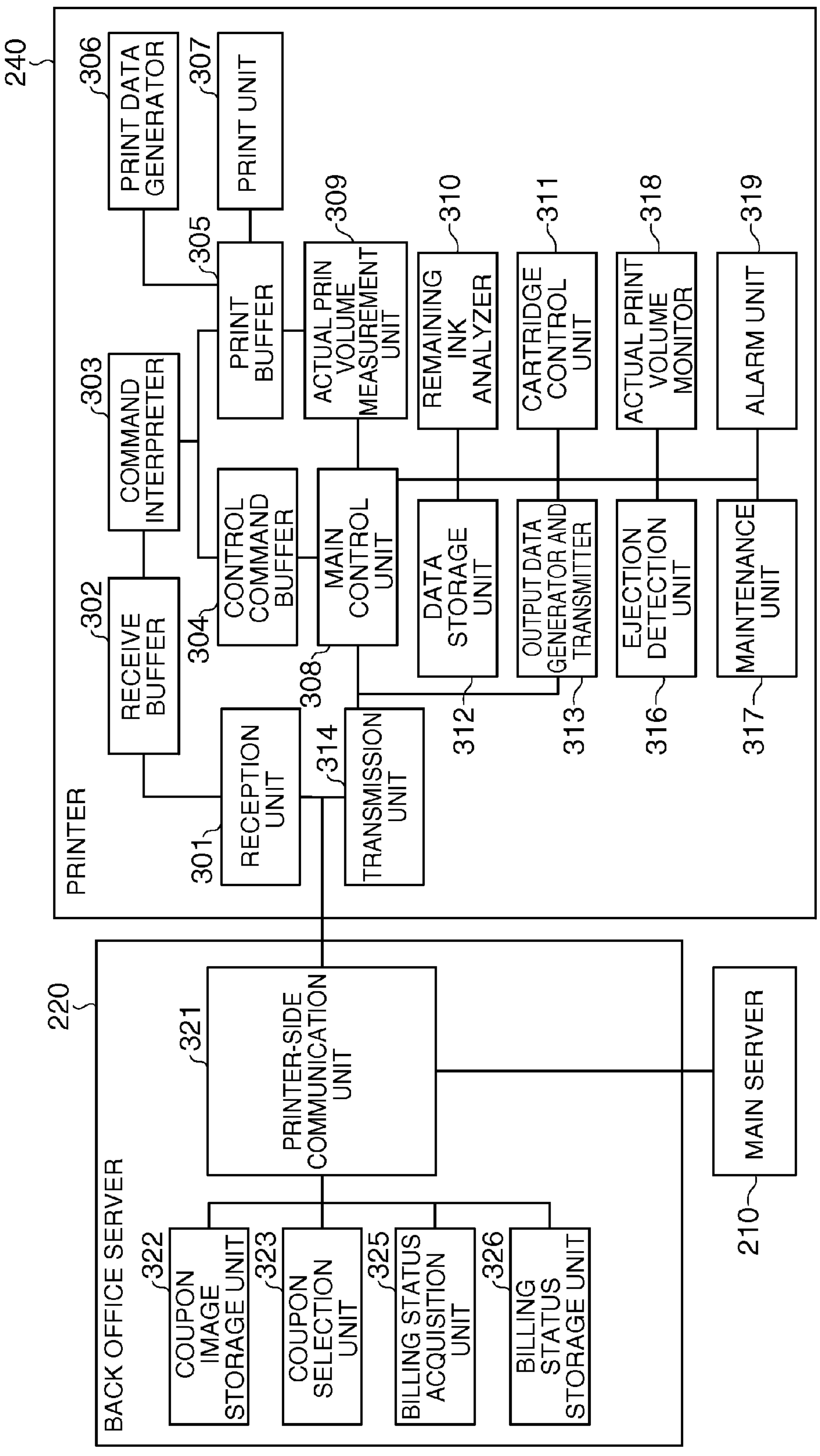
FIG. 6 is a function block diagram of a back office server and a printer.

FIG. 6 is a function block diagram showing internal processes of the printer 240. As shown in the figure, a reception unit 301 that receives commands and print data sent from the back office server 220, and a receive buffer 302 that temporarily stores the commands and print data received by the reception unit 301, are provided in the printer 240. The data received by the receive buffer 302 is interpreted by the command interpreter 303, and control commands are transferred to the control command buffer 304, and print data is transferred to the print buffer, by DMA, for example.

The print data temporarily stored in the print buffer 305 is converted by a data conversion process applied by the print data generator 306, producing dot pattern data corresponding to the nozzle array of the printhead 247 that is stored in the print buffer 305. This dot pattern data is, for example, 2-bit gray scale data indicating if ink ejected from the nozzles of the printhead 247 is (1) not ejected or ejected as a (2) small dot, (3) medium dot, or (4) large dot.

The print unit 307 drives the printhead 247 based on the dot pattern data stored in the print buffer 305 and creates a coupon by forming an image on the roll paper 11. The control command data temporarily stored in the control command buffer 304 is read by the main control unit 308, and paper cutting and other processes are performed according to the control commands.

The actual print volume measurement unit 309 counts the amount of ink ejected from the printhead 247 as the number of shots of each color per dot unit based on the print data stored in the print buffer 305 or the dot pattern data generated from the print data. Because the amount of ink ejected from the printhead 247 differs for small dots, medium dots, and large dots, ink usage tables are stored for each dot size (small dot, medium dot, and large dot). The number of shots is counted for each dot size, and the amount of ink used for printing (the total amount for all colors) is determined from the product of the shot count for each dot size and the amount of ink for each dot size. The actual print volume measurement unit 309 measures the total ink consumption for the one month from the start to the end of the month based on the passage of time kept by the RTC 249. More specifically, the amount of ink used in the first print job at the beginning of the month is determined from the counted number of shots and stored in the data storage unit 312, the amount of ink used in the second print job based on the counted number of shots is then added to the previously stored total ink consumption volume, and this process repeats with each print job to continuously update the actual print volume PV.

Note that the actual print volume measurement unit 309 counts the amount of ink corresponding to ink ejection from the printhead 247 when printing on the roll paper 11 as the number of shots of each color by dot unit. However, the amount of ink used to enable ejecting ink from the printhead 247, including ink ejected from the printhead 247 in the flushing operation, ink ejected from the printhead 247 by an ink suction means not shown, and ink that is used in the clogged nozzle recovery operation or ink charging operation, is not counted. Ink may be left in the ink cartridge 20 when the ink cartridge 20 reaches the ink end state, but a process for measuring this remaining ink is not performed. Only ink that is actually ejected onto the roll paper 11 and used for printing is counted.

The remaining ink analyzer 310 calculates the amount of ink of each color remaining in the ink cartridge 20. A value indicating the amount of ink left in the ink cartridge 20 is stored for each color in the memory device 27 of the ink cartridge 20. The current remaining amount of ink is obtained by subtracting the amount of ink used for printing (based on the measurement taken by the actual print volume measurement unit 309) and the amount of ink used for maintenance from the specific initial amount of ink in a newly installed ink cartridge. The remaining amount of ink is converted from the shot count to the amount of ink used in the case of printing operations and flushing operations, and a predetermined specific amount of ink is used as the amount of ink used in the case of suction operations. Note that the remaining amount of ink may be expressed as a percentage of the initial amount. The remaining amount of ink thus determined is stored in the data storage unit 312 at specific times (such as each print job), and is stored in the memory device 27 of the ink cartridge 20 by the cartridge control unit 311.

Measuring the amount of ink used by the actual print volume measurement unit 309 is an important function both for calculating the invoice amount and remaining ink management. More specifically, the actual print volume PV in a specific period L1, the total ink usage (the actual print volume PV plus ink used for maintenance), and the remaining amount of ink can be calculated and managed by simply providing a RTC 249 in the printer 240.

The cartridge control unit 311 is a control unit that controls reading information from the memory device 27 of the ink cartridge 20 installed in the printer 240, and writing information to the memory device 27. Processes executed by the cartridge control unit 311 are described below as related to reading the ink cartridge 20 ID. The data storage unit 312 is an area for storing printer information, and in this embodiment is a specific area in flash ROM 242, for example.

Figure 7:
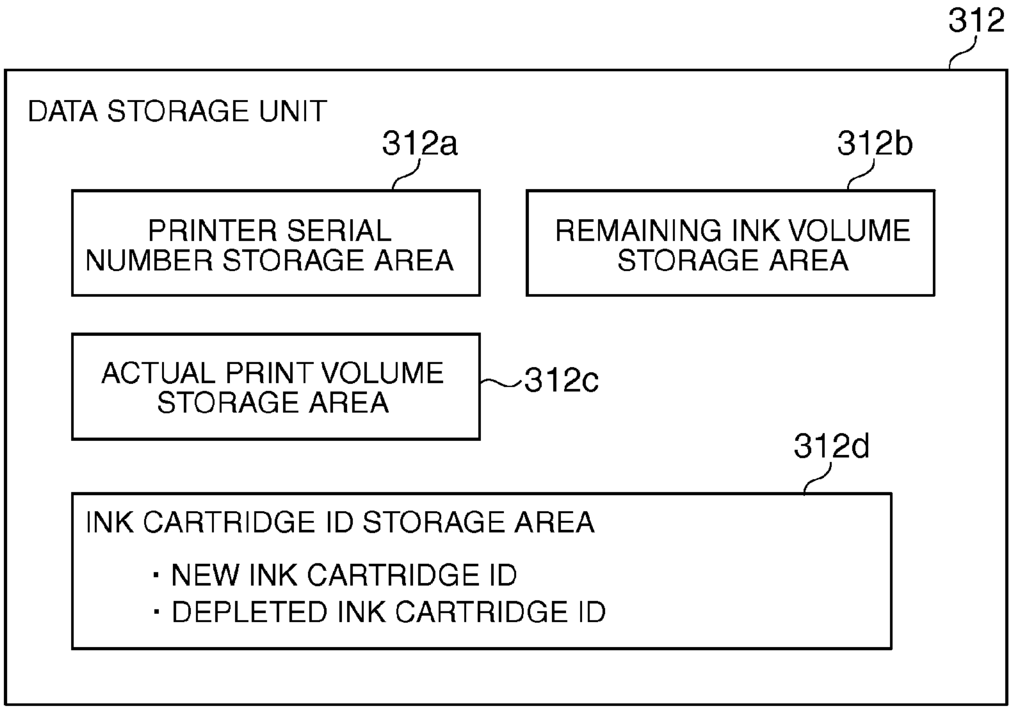
FIG. 7 describes a data storage unit.

FIG. 7 describes the ink cartridge ID storage area in the data storage unit 312. The data storage unit 312 includes a printer serial number storage area 312*a* that stores a printer serial number for distinguishing one printer 240 from the other printers; a remaining ink volume storage area 312*b* that stores the remaining amount of ink in the currently installed ink cartridge 20; an actual print volume storage area 312*c* that stores the actual print volume PV measured by the actual print volume measurement unit 309; and an ink cartridge ID storage area 312*d* that stores the ID of a newly installed ink cartridge, and the ID of the previous ink cartridge that reached the ink end and was replaced.

The ID of the newly installed ink cartridge, and the ID of the ink cartridges that reached the ink end, are identifiably stored in the ink cartridge ID storage area 312*d*, and a specific number of ink cartridge IDs can be stored. If writing more than this specific number of ink cartridge IDs is attempted, an error is returned because a problem likely occurred. These ink cartridge IDs identify if an ink cartridge 20 was properly installed in the printer 240, and if the ink cartridge 20 was used continuously until the ink end was reached, and are ultimately sent through the back office server 230 and main server 210 to the manufacturer server 110 as billing status information. The date and time an ink cartridge was installed, and date and time information indicating when the ink end was reached, are added to the ink cartridge ID information based on the time kept by the RTC 249. This enables the printer manufacturer 100 to determine the condition of the ink cartridges shipped to company X.

The output data generator and transmitter 313 collects billing-related information stored in the data storage unit 312 of the printer 240 (referred to below as billing status data), and creates and sends billing status information to the back office server 220, in response to a billing status transmission request from the back office server 220. The billing status information as used herein includes the serial number of the printer, the actual print volume PV, the remaining amount of ink, the ink cartridge ID of the new cartridge, and the ID of the ink cartridge that reached the ink end. The output data generator and transmitter 313 compiles this information into a single response to the billing status transmission request, and adds a checksum to improve data reliability to the create the billing status information. The resulting billing status information is then sent through the transmission unit 314 to the back office server 220.

Each time the print unit 307 completes a specific amount of printing, the ejection detection unit 316 detects ink ejection by each nozzle. This specific amount is determined according to the number of coupons printed, the printing time, and ejection count (number of shots ejected from all nozzles or a particular nozzle line). Ejection is inspected by setting a head cap not shown opposite the nozzle face of the printhead 247, and then selectively ejecting charged ink from plural ejection nozzles into the head cap. Whether or not ink was ejected is determined from change in the current produced when the ejected charged ink lands on the absorbent member in the head cap.

The maintenance unit 317 performs maintenance operations such as cleaning according to the results detected by the ejection detection unit 316. For example, if the ejection detection unit 316 determines that more than a specific number of nozzles are not ejecting, cleaning is performed. The maintenance unit 317 performs maintenance according to the temperature, barometric pressure, humidity, and other environmental conditions. For example, if the temperature (ambient temperature) is high, the possibility of bubbles forming and growing in the printhead 247 and causing ejection problems is high, and cleaning is performed more frequently (the detection period (a specific value) of the ejection detection unit 316 is shortened). If the ambient temperature is low, the possibility of bubbles forming and growing is low, and the number of cleaning operations is reduced (the detection period of the ejection detection unit 316 is lengthened). Note that a thermometer for measuring the temperature is preferably disposed in the printer 240 near the printhead 247. A barometer and hygrometer are also preferably provided, and the detection period of the ejection detection unit 316 is adjusted according to the results therefrom. Alternatively, the cleaning method could be changed, the ink suction volume changed, or the number of wiping operations changed according to the ambient conditions instead of changing the detection period.

The actual print volume monitor 318 monitors the actual print volume PV at specific times during the month (such as the 15th of each month) based on the results from the actual print volume measurement unit 309. If the actual print volume PV at the specific time monitored by the actual print volume monitor 318 is less than or equal to specific volume V0 (where specific volume V0 is less than or equal to a specific volume V1 used as the threshold for calculating the invoice amount), the alarm unit 319 issues a notice by causing the LED 6 to light steady or blink. As a result, printers 240 with a low print volume in company Y can be identified, and steps to level the print volume of the printers 240 (such as by interchanging printers 240) can be taken. Note that notification by sounding an electronic buzzer or displaying a message on a display instead of causing the LED 6 to light or blink is also possible.

Function of the Back Office Server

As shown in FIG. 6, the back office server 220 functions related to printing coupons and acquiring billing status information are achieved by a printer-side communication unit 321, coupon image storage unit 322, coupon selection unit 323, billing status acquisition unit 325, and billing status storage unit 326.

The printer-side communication unit 321 communicates with the main server 210 and printer 240. The coupon image storage unit 322 stores image data for printing plural different coupons. The coupon selection unit 323 gets product information triggered by the transaction process of the POS terminal, and selects image data appropriate to the product information from the coupon image storage unit 322. The selected image data is sent through the printer-side communication unit 321 to the printer 240, and printed by the printer 240. The company Y 400 can expect that giving coupons to customers will entice customers to come again (drive customers to the store again).

The billing status acquisition unit 325 is an API that requests the printer 240 to return billing status information, and sends a billing status transmission request through the printer-side communication unit 321 to the printer 240 according to a command from a host application program not shown. In this embodiment a billing status transmission request is sent once a month (such as the beginning of the month). When the billing status information is received from the printer 240 after sending a billing status transmission request, acknowledgement of the billing status information is sent to the printer 240 and the received billing status information is stored in the billing status storage unit 326.

The billing status acquisition unit 325 adds a data-dependent checksum or other value assuring data reliability to the billing status information. This reliability assurance value is data for ensuring the integrity of the data in the data package, and may be obtained by an operation that obtains the binary sum of all data, for example. Using this reliability assurance value enables determining in a later process if a value changed, verifying if transmission and reception were completed correctly in later communication operations, and controlling retransmission or an error handling procedure if the values differ. More specifically, by adding this reliability assurance value to the billing status information, the billing status acquisition unit 325 prevents data tampering and improves data reliability by enabling error detection. Note that adding a reliability assurance value to the billing status information is done by the billing status acquisition unit 325 in the back office server 220 in this embodiment, but the invention is not so limited. For example, a configuration in which the output data generator and transmitter 313 of the printer 240 adds a reliability assurance value to the billing status information, and sends billing status information protected by a reliability assurance value to the back office server 220, is also conceivable.

Main Server Functions

Figure 8:
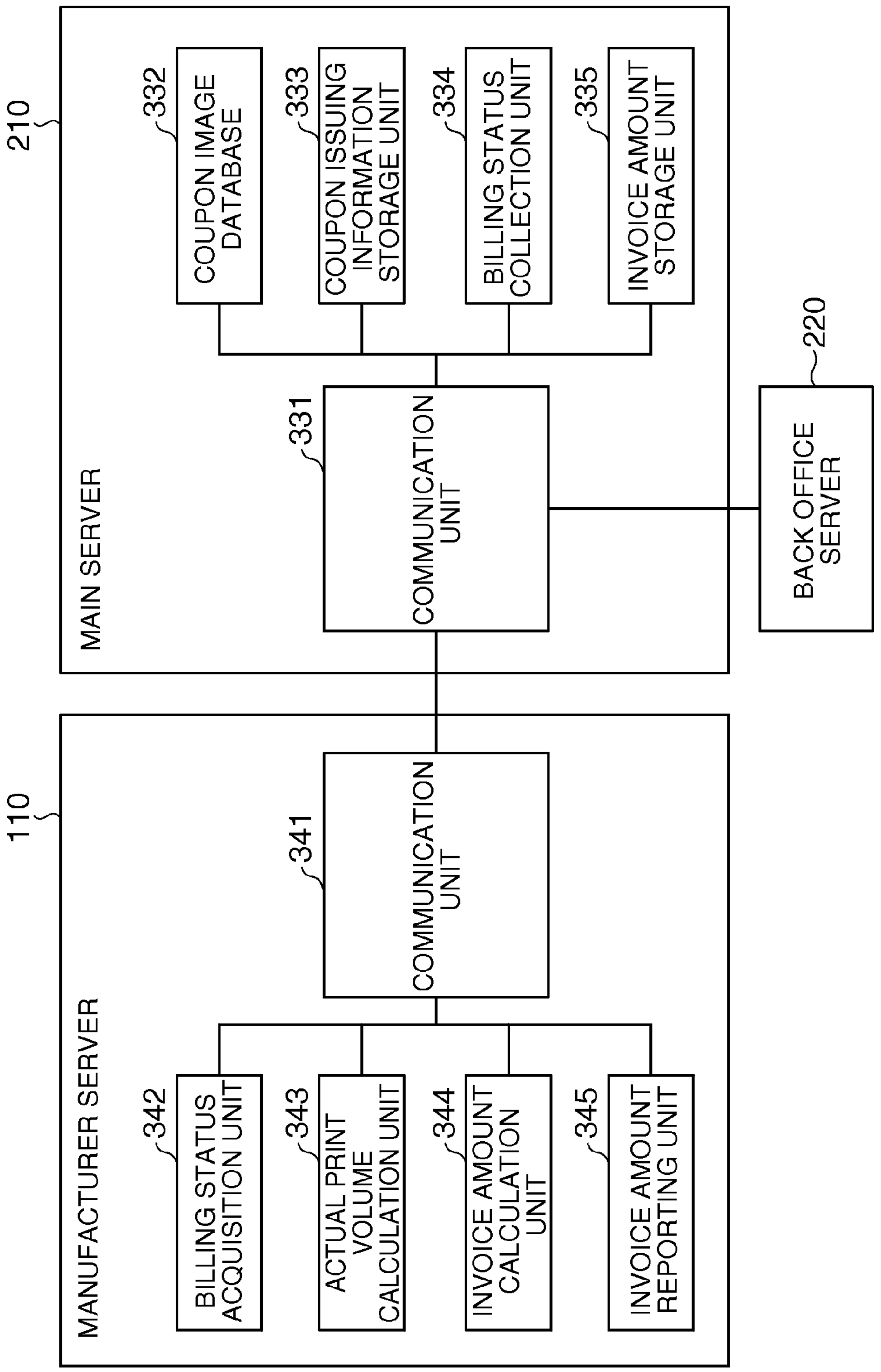
FIG. 8 is a function block diagram of a manufacturer server and a main server.

FIG. 8 is a function block diagram showing internal processes of the manufacturer server 110 and main server 210. The main server 210 functions related to printing coupons and receiving billing status information are rendered by a communication unit 331, coupon image database 332, coupon issuing information storage unit 333, billing status collection unit 334, and invoice amount storage unit 335.

The communication unit 331 communicates with the back office server 220 and manufacturer server 110.

The coupon image database 332 stores image data for plural different coupons related to product information for the related products. Data from the coupon image database 332 is sent to the back office server 220.

The coupon issuing information storage unit 333 collects and stores information about the types and numbers of coupons issued by the printer 240 from the back office server 220.

The billing status collection unit 334 collects billing status information from each back office server 220. The collected billing status information is sent each month to the manufacturer server 110.

The invoice amount storage unit 335 stores the invoice amounts reported from the manufacturer server 110 (the monthly invoice amount for each printer 240).

Main Server Functions

The manufacturer server 110 has a communication unit 341, billing status acquisition unit 342 (actual print volume acquisition unit), actual print volume calculation unit 343, invoice amount calculation unit 344, and invoice amount reporting unit 345 for functions related to calculating the invoice amount.

The communication unit 341 communicates with the main server 210.

The billing status acquisition unit 342 (actual print volume acquisition unit) gets billing status information from each printer 240. In this embodiment the billing status acquisition unit 342 gets for each printer 240 (for each printer serial number) the actual print volume PV indicating the amount of ink used for actual printing and not including maintenance operations once each month (such as at the beginning of the month) for the preceding month.

The actual print volume calculation unit 343 then determines for each printer 240 if the actual print volume PV is less than or equal to specific volume V1.

If the actual print volume PV is less than or equal to the specific volume V1, the invoice amount calculation unit 344 sets the invoice amount to a first invoice amount, which is a fixed amount. If the actual print volume PV is greater than the specific volume V1, the invoice amount calculation unit 344 calculates a second invoice amount that increases according to the actual print volume PV as the invoice amount. This first invoice amount is an amount based on the sum of the specific volume V1 and the maintenance volume MV, which is the amount of ink used for maintenance operations during the specific period Ll. This method of calculating the invoice amount is described in detail below.

The invoice amount reporting unit 345 then reports to the main server 210 the invoice amounts for all printers 240 managed thereby. Note that the invoice amounts for all printers 240 could be totaled and reported to the main server 210 as the invoice amount.

Ink Cartridge ID Reading Process 1: when a cartridge is loaded in the printer

Figure 9:
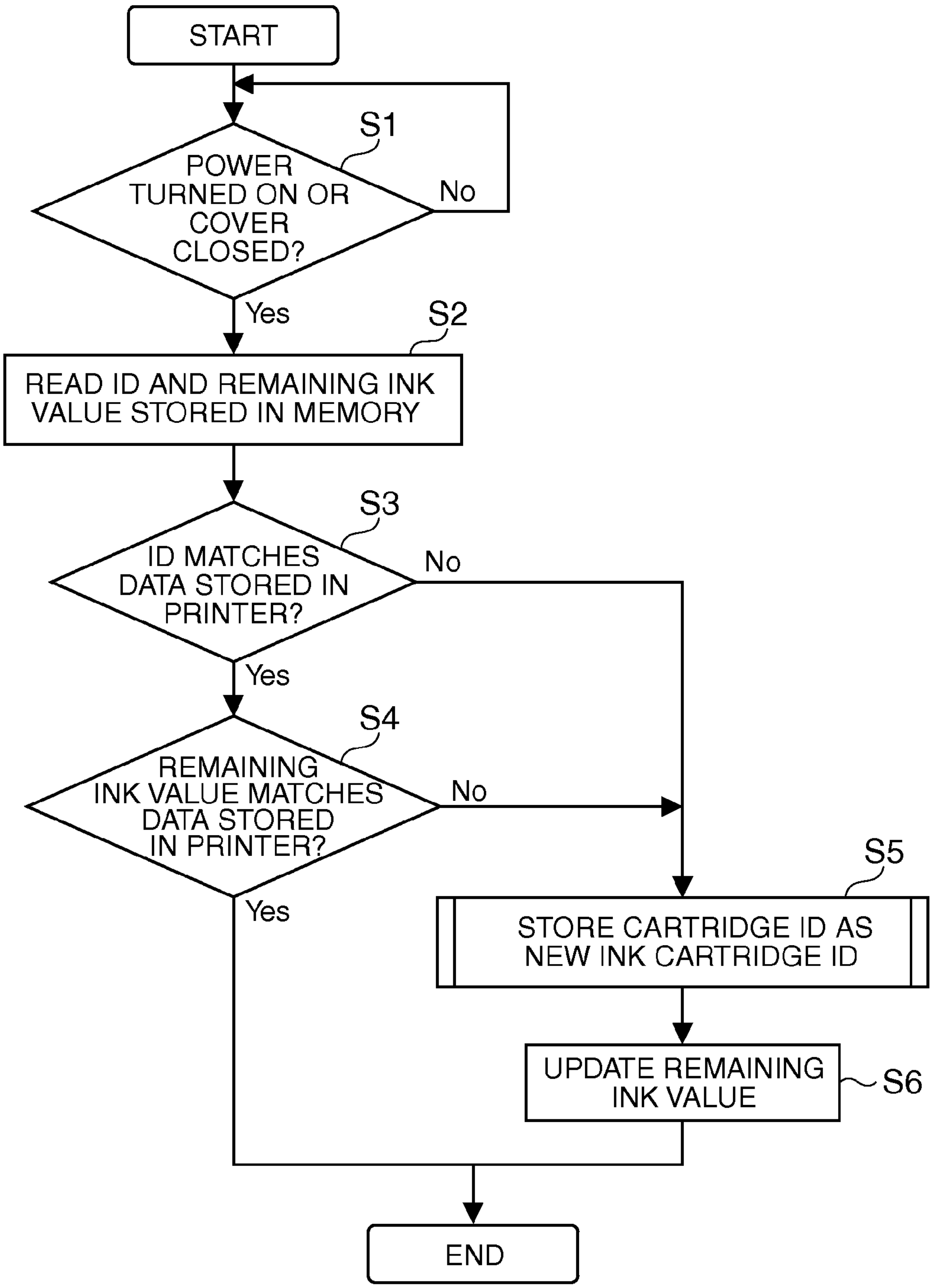
FIG. 9 is a flow chart of the process performed when the power turns on or when a cartridge is installed.

FIG. 9 is a flow chart of the process performed when printer power turns on or an ink cartridge 20 is installed.

When a new ink cartridge 20 is installed in the printer 240, the cartridge control unit 311 reads the ink cartridge ID from the memory device 27 of the ink cartridge 20. More specifically, when the printer 240 power turns on, or when the cover sensor 248 detects that the ink cartridge unit cover 7 was closed (S1 returns Yes), the cartridge control unit 311 reads the ink cartridge ID and the remaining ink value (S2), and checks if the ink cartridge ID matches the ID stored in the data storage unit 312 (S3). If the two IDs match (S3 returns Yes), the cartridge control unit 311 checks if the remaining ink value stored in the data storage unit 312 and the remaining ink value read from the ink cartridge are the same (S4). If the two remaining ink values match, the currently installed ink cartridge 20 is determined to be the same ink cartridge that was installed before the power turned on or before an ink cartridge was installed, and the process ends.

However, if the IDs do not match (S3 returns No), or if the remaining ink values do not match (S4 returns No), the currently installed ink cartridge 20 is an ink cartridge 20 that is different from the ink cartridge that was installed before the power turned on or a cartridge was installed, and the cartridge control unit 311 stores the ink cartridge ID that was read (S5). The cartridge control unit 311 then reads the remaining ink value from the memory device 27 of the ink cartridge 20 that was installed, and based on the read remaining ink value updates the remaining ink volume storage area 312*b* of the data storage unit 312 (S6). The cartridge control unit 311 also increments a cartridge installation counter set in the memory device 27 of the ink cartridge 20 by one. This operation updates information stored in the ink cartridge 20 that identifies how many times that ink cartridge 20 was installed in a printer.

Ink Cartridge ID Reading Process 2: at Ink End

Figure 10:
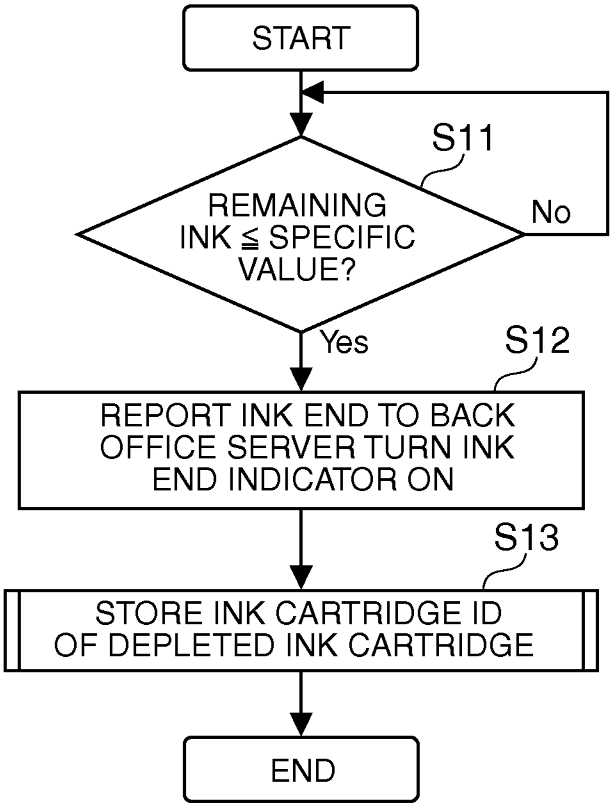
FIG. 10 is a flow chart of a process performed at the ink end.

FIG. 10 is a flow chart of the process performed when the ink cartridge runs out of ink (the ink end). In this embodiment of the invention the remaining ink analyzer 310 determines if the ink cartridge has run out of ink (if the ink end has been reached). The remaining ink analyzer 310 calculates how much ink is left and determines the remaining ink value for each color of ink in the ink cartridge 20, and determines that the ink end has been reached if the remaining ink value is less than a specific value for at least one color.

The remaining ink analyzer 310 first checks if the remaining ink value has dropped to or below this specific value for at least one color (S11). This specific value accommodates error between the remaining ink value calculated by the remaining ink analyzer 310 and the amount of ink actually remaining, and is set to a value that returns an ink end decision when the actual amount of ink remaining in the ink cartridge 20 is a small percentage of the cartridge capacity instead of when the actual physical end of ink is reached (when the amount of ink in the ink cartridge 20 is 0). Because this setting returns an ink end decision before the ink supply is actually depleted, the printhead 247 can be prevented from printing with no ink, and introducing air to the printhead 247 can be avoided.

If the remaining ink value goes to or below the specific value for at least one color (S11 returns Yes), the printer 240 sends an ink end report to the back office server 220 through the output data generator and transmitter 313, causes an LED 6 on the outside panel of the printer 240 to blink and prompts the user to replace the ink cartridge 20 (S12). The cartridge control unit 311 then reads the ink cartridge ID from the memory device 27 of the ink cartridge 20, and stores the read ink cartridge ID as the ID of an ink cartridge that reached the ink end in the ink cartridge ID storage area 312*d* of the data storage unit 312 (S13).

When the ink end is reached, the back office server 220 prohibits printing using that printer 240 until the ink cartridge is replaced. When the user then replaces the ink cartridge, the sequence described in FIG. 9 is performed, the new ink cartridge 20 is recognized by the printer 240, and printing resumes if that ink cartridge 20 is not at the ink end. The ink cartridge ID of the newly installed ink cartridge 20 and the ID of the ink cartridge that reached the ink end are thus stored as information in the printer 240 in this embodiment of the invention. These ink cartridge IDs are collected by the back office server 220 and ultimately reported to the manufacturer server 110 by the process described next below. The ink cartridge ID collection process is described below.

Collecting Billing Status Information from Printers

Figure 11:
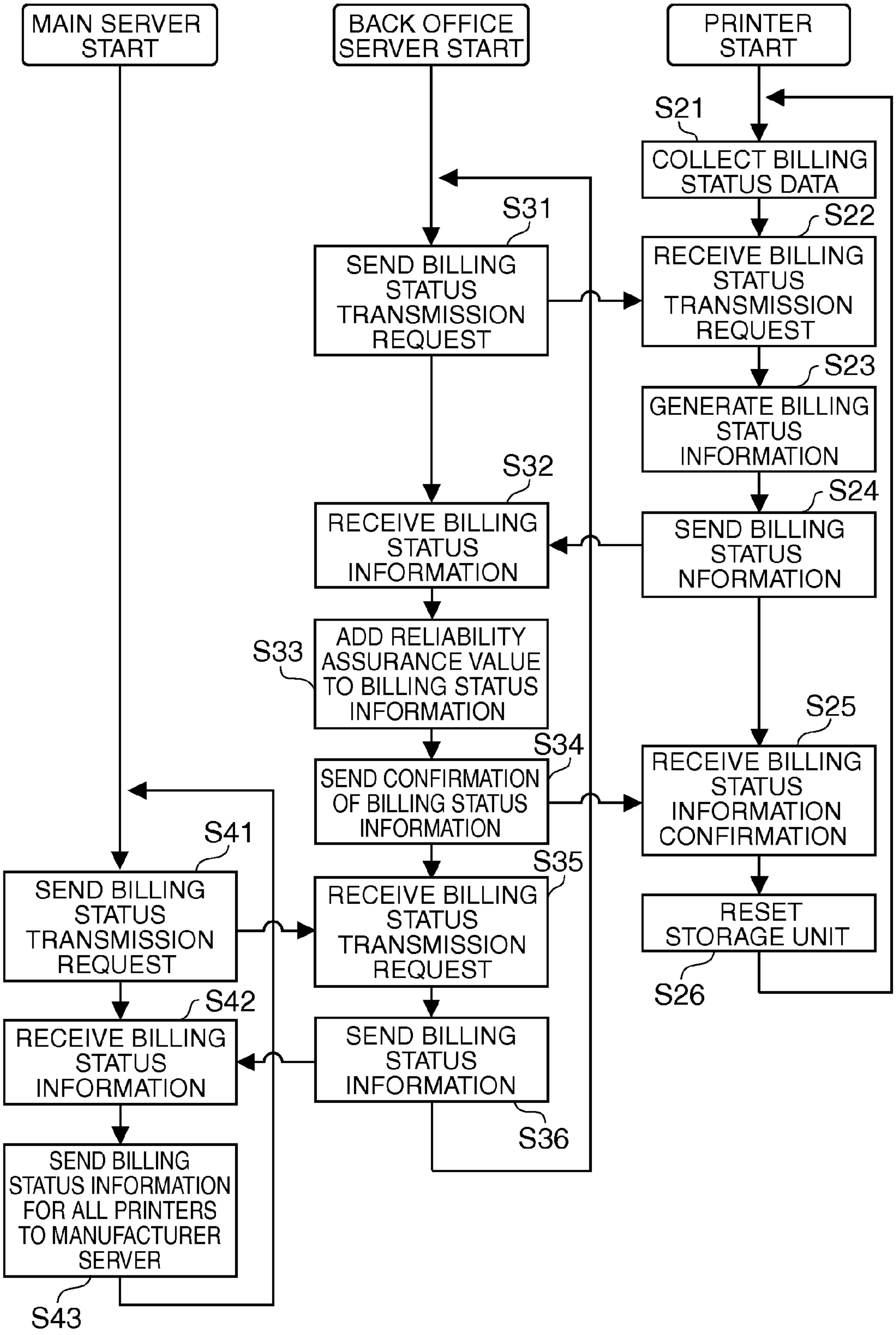
FIG. 11 is a flow chart of a billing status information collection process.

FIG. 11 is a flowchart of the billing status information collection process.

Each printer 240 first compiles the billing status data by measuring the actual print volume PV by means of the actual print volume measurement unit 309, and retrieving the ink cartridge ID of the installed ink cartridge 20 and the ink cartridges 20 that reached the ink end by means of the remaining ink analyzer 310 and cartridge control unit 311 (S21).

The back office server 220 sends a billing status transmission request to all printers 240 in the store (S31). When the billing status transmission request is received (S22), each printer 240 adds a checksum to the billing status data stored in the data storage unit 312 and generates the billing status information (S23). The output data generator and transmitter 313 then sends the resulting billing status information to the back office server 220 (S24).

When the billing status information is received from a printer 240 (S32), the back office server 220 adds a reliability assurance value to the received billing status information to assure the reliability of the data and saves the result (S33), and then returns confirmation of receiving the billing status information to the printer 240 (S34). When the printer 240 receives confirmation that the billing status information was received (S25), the printer 240 resets the data storage unit 312 (S26). Printer 240 operation then returns to step S21, billing status information is collected, and steps S22 to S26 repeat.

At a specific timing after the billing status information is received by the back office server 220 from the printers 240, the main server 210 sends a billing status transmission request requesting transmission of the billing status information to all back office servers 220 (S41). When the billing status transmission request is received (S35), the back office server 220 sends the billing status information to the main server 210 (S36). When the billing status information is received from a back office server 220 (S42), the main server 210 stores the billing status information. Billing status information for all printers 240 is thus collected in the main server 210 insofar as the printers 240 are operating properly and there are no special circumstances such as a printer 240 failure or printer 240 power being off. The main server 210 then sends the collected billing status information for all printers 240 to the manufacturer server 110 (S43). The main server 210 could send the billing status information automatically or in response to a request from the manufacturer server 110.

Because a reliability assurance value is automatically added to the billing status information by the back office server 220 in the billing status information collection model described above, the validity of the data sent to the main server 210 and the manufacturer server 110 can be assured even if the data is partially damaged. In addition, even if tampering with the data is attempted, the tampering can be discovered and handled appropriately because the reliability assurance value will not match the content of the billing status information.

Calculating the Invoice Amount on the Manufacturer Server

Figure 12:
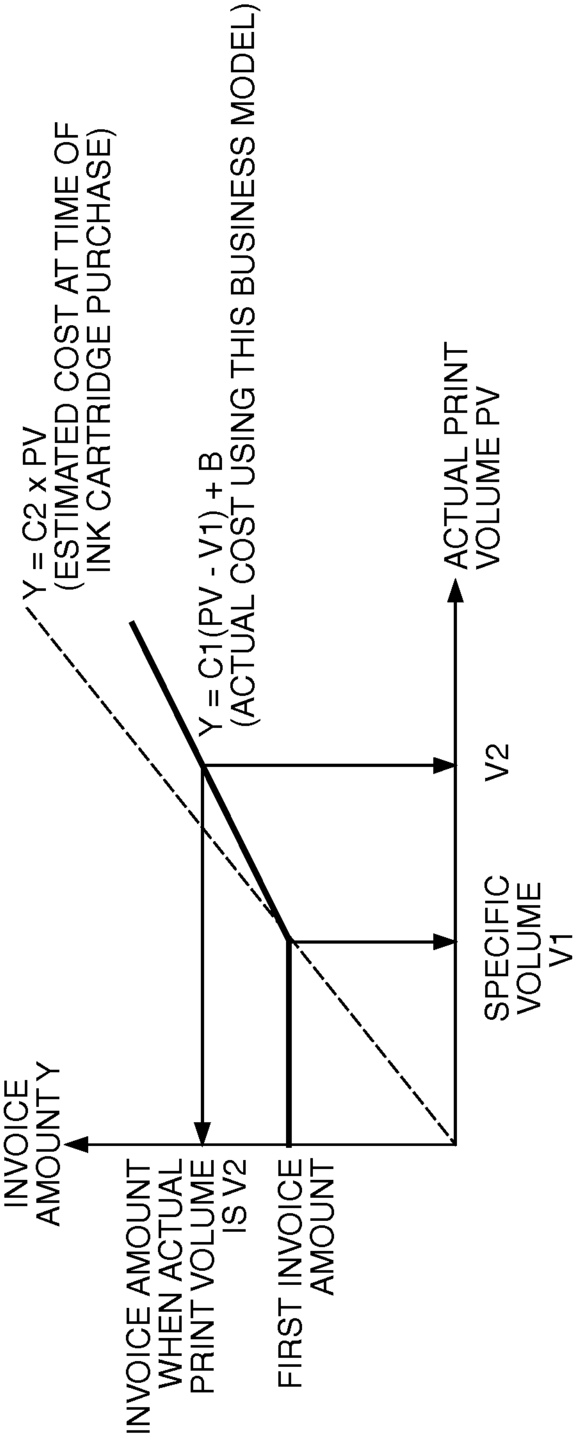
FIG. 12 describes the relationship between the actual print volume and the invoice amount.

FIG. 12 is a graph showing the relationship between the actual print volume PV and the invoice amount Y. The y-axis shows the invoice amount Y for one month, and the x-axis shows the actual print volume PV representing the amount of ink used for printing in one month. As described above, the manufacturer server 110 (invoice amount calculation unit 344) uses an algorithm that calculates a different invoice amount based on whether or not the actual print volume PV measured by a particular printer 240 is less than or equal to a predetermined specific volume V1. In FIG. 12, the relationship between the actual print volume PV and invoice amount Y is indicated by the bold line.

As shown in the figure, if the actual print volume PV is less than or equal to specific volume V1, the invoice amount is a first invoice amount that is a fixed amount. If the actual print volume PV exceeds the specific volume V1, the invoice amount is a second invoice amount that increases according to the actual print volume PV. Note that in the figure the dotted line (Y=C2×PV) shows the relationship between the actual print volume PV and amount (price) Y when an ink cartridge 20 is purchased. However, while the coefficient C2 in the formula Y=C2×PV (where C2>0) denotes the cost of ink when the ink cartridge 20 is purchased, the actual print volume PV and amount (price) Y cannot actually be expressed by a simple proportional relationship because ink is also consumed for maintenance during printer operation. The relationship of the amount (cost) to the actual print volume PV is therefore indicated by the dotted line merely to assist comparison with the solid line denoting the relationship between the actual print volume PV and the invoice amount Y.

A specific method of calculating the first invoice amount and second invoice amount is described next with reference to FIG. 13. Note that the values shown in the figure are simply to facilitate understanding and discussion, and are not necessarily the actual values that might be used.

As shown in FIG. 13(*a*), the maintenance volume MV per month (specific period L1) (that is, the amount of ink used for maintenance operations that consume ink) can be estimated from the specifications of the actual printer 240 and the maintenance algorithm used by the printer 240, and is set to 5 cc in this example. This is an amount of ink that is used regardless of the actual print volume PV. Note that the maintenance algorithm for preventing ink clogging varies according to the usage pattern of the printer user (customer). The algorithm could also be changed by a setting. More specifically, the manufacturer server 110 may acquire the maintenance pattern or algorithm, which varies according to how the user uses the printer 240, or the algorithm (pattern) set in the printer 240 or back office server 230, and change the estimated maintenance volume MV per month (specific period L1) according to the acquired algorithm (pattern). The ratio of the maintenance volume MV to total ink usage (actual print volume PV+maintenance volume MV) is set with consideration for the average frequency of printer use, and in this example the proportion of maintenance volume MV to total ink usage is set to 25%. When this proportion is high, a business model based on billing for ink consumption by inkjet printers is not viable.

FIG. 13(*b*) shows a formula for calculating the total ink usage per month. As described above, if the maintenance volume MV is 5 cc and the proportion of total ink usage consumed by the maintenance volume MV is 25%, total ink usage per month is 5 cc (maintenance volume MV)/25% percentage of total ink usage consumed by the maintenance volume MV)=20 cc.

FIG. 13(*c*) shows a formula for calculating specific volume V1. This specific volume V1 is calculated to be 15 cc by subtracting 5 cc from the total ink usage per month of 20 cc.

FIG. 13(*d*) shows a formula for calculating the first invoice amount. If the standard price per 1 cc of ink is 100 yen, and total ink usage per month is 20 cc, first invoice amount is the product of the standard price per 1 cc ink and the total ink usage per month, or 2000 yen. More specifically, by calculating invoice amount Y as a fixed amount instead of calculating the invoice amount Y based on the actual print volume PV until the actual print volume PV reaches the specific volume V1 (15 cc in this example), the business model is viable for the printer manufacturer 100 even when the actual print volume PV of the printer 240 is low.

FIG. 13(*e*) shows a formula for calculating the second invoice amount. The second invoice amount is calculated from the formula Y=C1×(V2−V1)+B (where 021 C1<C2). In this formula, coefficient C1 is the price (discounted price) per 1 cc ink using this business model, and is 60 yen in this example. Constant B is the first invoice amount (2000 yen). Using this formula, if actual print volume PV is V2(30 cc), invoice amount Y is calculated to be 2900 yen. The second invoice amount is thus calculated by adding the fixed amount to the product of coefficient C1 and the actual amount of ink used (V2−V1) in excess of the specific volume V1.

It will be obvious that the coefficient and constant values described above can be changed as desired. For example, the value of C1 could be increased (in the range where C1<C2) and the second invoice amount calculated using the formula Y=C1×PV. For example, if C1=90 yen, the invoice amount Y when the actual print volume PV is V2 (30 cc) will be 90 yen×30 cc=2700 yen. This configuration simplifies determining the second invoice amount, and can provide a billing system that is easier to understand for the customer (company X 200).

As described above, by billing a first invoice amount that is based on the maintenance volume MV when the actual print volume PV is a specific volume V1 or less, that is, when the print volume of the printer 240 is low, this embodiment of the invention solves the problem of the business model not being viable for the printer manufacturer 100 that bills customers for the invoice amount because the invoice amount will be too low relative to the total ink consumption. At the same time, the invoiced amount is more reasonable for the company X 200 that is billed when the actual print volume PV exceeds the specific volume V1, that is, when the print volume of the printer 240 is high, because the customer is billed for a second invoice amount that increases based only on the actual print volume PV. By thus achieving a business model that is not disadvantageous for either the side doing the billing or the side being billed regardless of the print volume, opportunities to serve more customers can be expanded and further development of the printer invoicing system SY can be expected.

Variation of the Invoice Amount Calculation Method

Variations of the invoice amount calculation method are described below.

The first invoice amount could be varied according to the actual print volume PV during the previous month (the previous specific period L1). This configuration requires memory for storing past actual print volume PV information in the manufacturer server 110. FIG. 14A shows an example that uses a threshold value of 20 cc, and when the actual print volume PV for the previous month was 20 cc or more, sets a billing adjustment amount to a discount (−200 yen) and changes the first invoice amount to 2000 yen (a fixed base rate) minus the 200 yen discount.

Alternatively, as shown in FIG. 14B, the value of coefficient C1 could be changed according to the actual print volume PV during the previous month (the previous specific period L1). As shown in the figure, when the threshold value is 40 cc and the actual print volume PV during the previous month is 40 cc or more, coefficient C1 is reduced (to 10 yen less than the basic ink price C1).

As shown in FIGS. 14A and 14B, services such as discounts for customers with high volume printing needs can be provided by varying the first invoice amount (fixed amount) or the value of coefficient C1 according to the actual print volume PV in the previous month. Note that the actual print volume PV in the previous month is compared with the threshold value in the foregoing examples, but the threshold value could obviously be compared with the actual print volume during some other specific past period of time, including the actual print volume two months before or the total actual print volume during the previous year, and the first invoice amount or the coefficient C1 adjusted based on the result of this comparison. Further alternatively, the first invoice amount or coefficient C1 could be varied according to the average actual print volume during some past period of time.

The actual print volume PV is included in the billing status information in the foregoing embodiment, but a configuration that also includes the maintenance volume MV is also conceivable. In this configuration each printer 240 counts the amount of ink used for maintenance during the specific period L1, and records this amount as the maintenance volume MV in the data storage unit 312. The maintenance volume MV is also accumulated in the manufacturer server 110 as part of the billing status information. The manufacturer server 110 stores the past maintenance volume MV in a specific place in memory. The first invoice amount and coefficient C1 can then be varied according to the maintenance volume MV during the past specific period. The first invoice amount and coefficient C1 could also be varied according to the past total ink usage (actual print volume PV+maintenance volume MV). The first invoice amount and coefficient C1 could also be varied according to the ratio between the maintenance volume MV and the actual print volume PV in the same past period of time. Further alternatively, the first invoice amount and coefficient C1 could be varied according to the actual print volume PV, maintenance volume MV, total ink usage, and ratio between the actual print volume PV and maintenance volume MV during the month (the specific period L1 used for calculating the invoice amount).

The actual print volume PV is determined for each printer 240 in the foregoing embodiment, but could be determined for each store 410. More specifically, the manufacturer server 110 could calculate the total actual print volume PV of the plural printers 240 in the store 410, and calculate the invoice amount according to the resulting total actual print volume PV. Further alternatively, a configuration in which the manufacturer server 110 calculates the total actual print volume PV for all printers 240 in all stores managed by company Y 400, or all printers 240 managed by the main server 210, and calculates the invoice amount according to that total actual print volume PV, is also conceivable.

The first invoice amount is a fixed amount in the foregoing embodiment, but the first invoice amount could be calculated based on the total of the actual print volume PV in the specific period L1 and the maintenance volume MV in the specific period L1. More specifically, if the actual print volume PV is less than or equal to specific volume V1, the first invoice amount is calculated using a formula of which the actual print volume PV and maintenance volume MV are parameters; if the actual print volume PV is greater than the specific volume V1, the second invoice amount is calculated by a formula using only the actual print volume PV as a parameter. The first invoice amount is different in this case when the actual print volume PV is 0 (zero) and when it is specific volume V1, but because the amount is based on the amount of ink actually consumed, there is no disadvantage to the printer manufacturer 100. Yet further alternatively, the first invoice amount could be calculated by adding a fixed amount based on the specific volume V1 (product of specific volume V1 and ink price=1500 yen) to a formula using only the maintenance volume MV as a parameter to calculate the first invoice amount.

Use of the first invoice amount and second invoice amount is determined according to a threshold value V1 (specific volume V1) in the embodiment described above, but application of the first invoice amount and second invoice amount could be determined according to whether the ratio of the actual print volume PV to the maintenance volume MV is greater than or equal to a specific ratio. Further alternatively, application of the first invoice amount and second invoice amount could be determined according to whether the ratio of the actual print volume PV to the total ink usage (actual print volume PV+maintenance volume MV) is greater than or equal to a specific ratio.

The actual print volume calculation unit 343 in the foregoing embodiment also determines if the actual print volume PV is less than or equal to a specific volume V1, but could alternatively determine if the number of coupons printed is less than or equal to a specific number. This configuration enables the company X 200 (customer) to know the threshold at which the second invoice amount applies in terms of the number of coupons printed.

Other Variations

Other variations of the invoice amount calculation method are described below. The actual print volume measurement unit 309 in the embodiment described above counts the amount of ink ejected from the printhead 247 in dot units based on the print data or dot pattern data stored in the print buffer 305, but could count the number of ink shots actually ejected from the printhead 247 based on the result detected by the ejection detection unit 316. When ink is not ejected due to a clogged nozzle, for example, this configuration enables subtracting that amount from the actual print volume PV, and more specifically enables measuring the actual print volume PV more accurately.

The billing status information described above includes the actual print volume PV as the total for all colors, but the actual print volume PV could be counted separately for each color. In this case, the invoice amount calculation unit 344 could calculate the second invoice amount based on the price of each color of ink and the actual print volume PV of each color.

Further alternatively, instead of including the actual print volume PV in the billing status information, the total number of shots (of each color separately, or the total for all colors combined) in one month could be included. In this case, the shot count is converted to an ink volume by the back office server 220, main server 210, or manufacturer server 110.

The main server 210 in the foregoing embodiment gathers the billing status information each month and sends the information to the manufacturer server 110 monthly, but the period for which the billing status information is collected and transmitted could be less than the specific period L1, including weekly or daily. The data collection period and transmission period also do not have to be the same. For example, the main server 210 could collect the billing status information weekly, and send the data to the manufacturer server 110 at one time monthly.

The foregoing embodiment describes a configuration in which plural colors of ink are contained in a common single ink cartridge, but different ink cartridges could obviously be used for each color. An example using an inkjet printer and ink cartridge is described above, but the invention can also be applied to configurations using laser printers and toner cartridges by using a value that can be converted to a toner consumption amount, such as a specific charging time unit, instead of the number of shots described above.

The alarm unit 319 of the printer 240 issues a warning when the actual print volume PV checked by the actual print volume monitor 318 at specific times is a specific volume V0 or less in the foregoing embodiment, but these operations could be performed by the main server 210 of company X 200. This configuration enables adjusting the print volume (actual print volume PV) of the printers 240 by changing the product information related to the coupon image data, for example. However, this configuration requires the main server 210 to collect the billing status information at a period shorter than the specific period L1, such as by collecting the billing status information weekly or semi-monthly. The actual print volume monitor 318 and alarm unit 319 could also be provided in the manufacturer server 110. In this case, the period at which the manufacturer server 110 acquires the billing status information must be less than the specific period L1. A warning could also be issued by sending a command for issuing a warning to the printer 240 or main server 210, or sending an e-mail message to a particular e-mail address of the company X 200.

The foregoing embodiment describes a business model involving three companies, the printer manufacturer 100, company X 200, and company Y 400, but a business model involving only two companies, the printer manufacturer 100 and company Y 400, for example, is also conceivable. In this model the printer manufacturer 100 both supplies the ink cartridges and invoices company Y 400.

The manufacturer server 110 could also be omitted and the invoice amount calculation process executed on the printer 240. In this configuration certain parts of the manufacturer server 110 described above (the billing status acquisition unit 342 (actual print volume acquisition unit), actual print volume calculation unit 343, invoice amount calculation unit 344, and invoice amount reporting unit 345) are provided in the printer 240, and the calculated invoice amount is sent through the back office server 220 to the main server 210. This configuration can simplify the configuration of the printer invoicing system SY.

The actual print volume measurement unit 309 of the printer 240 could also be provided in the back office server 220. In this configuration the back office server 220 calculates the number of shots and determines the amount of ink used based on the coupon image data sent to the printer 240.

Elements of the printer invoicing system SY described above can also be provided as a program that is stored on a non-transitory medium, including but not limited to CD-ROM and flash memory. More specifically, such a program that causes a computer to function as do certain elements of the printer invoicing system SY, as well as a non-transitory recording medium storing the program, are also included in the scope of the invention.

The invention having being thus described, it will be apparent to those skilled in the art based on this disclosure that variations are possible. Any and all such variations are intended to be included in the scope of the invention to the extent embraced by any of the following claims.

What is claimed is:

1. An invoice amount calculation method for an inkjet printer that performs maintenance accompanied by ink consumption, the method comprising:

acquiring an actual print volume PV, which is the amount of ink used for actual printing not including maintenance during a specific period L1;

determining if the actual print volume PV is less than or equal to a specific volume V1; and calculating an invoice amount by calculating (i) a first invoice amount, which is a fixed amount, as the invoice amount when the actual print volume PV is less than or equal to the specific volume V1, or (ii) a second invoice amount based on the actual print volume PV as the invoice amount when the actual print volume PV exceeds the specific volume V1.

2. The invoice amount calculation method described in claim 1, wherein, when the actual print volume PV is less than or equal to the specific volume V1, the first invoice amount is calculated based on the total of the specific volume V1 and a maintenance volume MV, which is the amount of ink used for maintenance in the specific period L1.

3. The invoice amount calculation method described in claim 2, wherein the maintenance volume MV is a fixed value, and the first invoice amount is a fixed amount that does not vary according to the actual print volume PV in the specific period L1.

4. The invoice amount calculation method described in claim 2, wherein the first invoice amount is also calculated based on an adjustment amount that is added to or subtracted from a base fixed amount according to a past actual print volume PV, where the base fixed amount is the product of an ink price and the total of the specific volume V1 and the maintenance volume MV.

5. The invoice amount calculation method described in claim 1, wherein the first invoice is calculated based on a past actual print volume PV.

6. The invoice amount calculation method described in claim 5, wherein the past actual print volume PV is an actual print volume in a period immediately prior to the specific period L1.

7. The invoice amount calculation method described in claim 1, wherein the second invoice amount is calculated based on the product of the actual print volume PV and a coefficient C1, where $C1>0$, that varies according to a past actual print volume PV.

8. The invoice amount calculation method described in claim 1, further comprising:

monitoring the actual print volume PV at one or more specific times before the end of the specific period L1; and issuing a warning when the actual print volume PV is less than or equal to a specific volume V0 (where $0<V0\leq V1$).

9. An invoice amount calculation device for an inkjet printer that performs maintenance accompanied by ink consumption, the device comprising:

an actual print volume acquisition unit that acquires an actual print volume PV, which is the amount of ink used for actual printing not including maintenance during a specific period L1;

an actual print volume evaluation unit that determines if the actual print volume PV is less than or equal to a specific volume V1; and an invoice amount calculation unit that calculates an invoice amount according to the actual print volume PV, the invoice amount calculation unit calculating a first invoice amount, which is a fixed amount, as the invoice amount when the actual print volume PV is less than or equal to the specific volume V1, and calculating a second invoice amount based on the actual print volume PV as the invoice amount when the actual print volume PV exceeds the specific volume V1.

10. The invoice amount calculation device described in claim 9, wherein, when the actual print volume PV is less than or equal to the specific volume V1, the first invoice amount is calculated as the total of the specific volume V1 and a maintenance volume MV, which is the amount of ink used for maintenance in the specific period L1.

11. A printer invoicing system including the invoice amount calculation device described in claim 9 and further comprising a printing system in communication with the invoice amount calculation device and including a print unit that prints by ejecting ink, the printing unit further comprising:

an ejection detection unit that detects ink ejection by the print unit, a maintenance unit that performs the maintenance according to the detection result from the ejection detection unit, and an actual print volume measuring unit that measures the actual print volume PV used for printing by the print unit;

wherein the actual print volume acquisition unit acquires the actual print volume PV measured by the actual print volume measuring unit.

12. The printer invoicing system described in claim 11, wherein, the ejection detection unit detects if ink was ejected each time a specific amount of printing is completed by the print unit, and the maintenance unit performs maintenance when the ejection detection unit detects that ink was not ejected.

13. The printer invoicing system described in claim 11, wherein the maintenance unit performs maintenance based on ambient conditions including at least one of temperature, barometric pressure, and humidity.

14. The printer invoicing system described in claim 11, wherein the printing system further includes:

an actual print volume monitoring unit that monitors the actual print volume PV at one or more specific times before the end of the specific period L1 based on the result of the measurement by the actual print volume measuring unit, and a warning unit that issues a warning when the actual print volume PV is less than or equal to a specific volume V0 (where $0<V0\leq V1$).

* * * * *